(No Model.)
E. B. CHADWICK.
HOOF EXPANDER.
No. 497,629. Patented May 16, 1893.
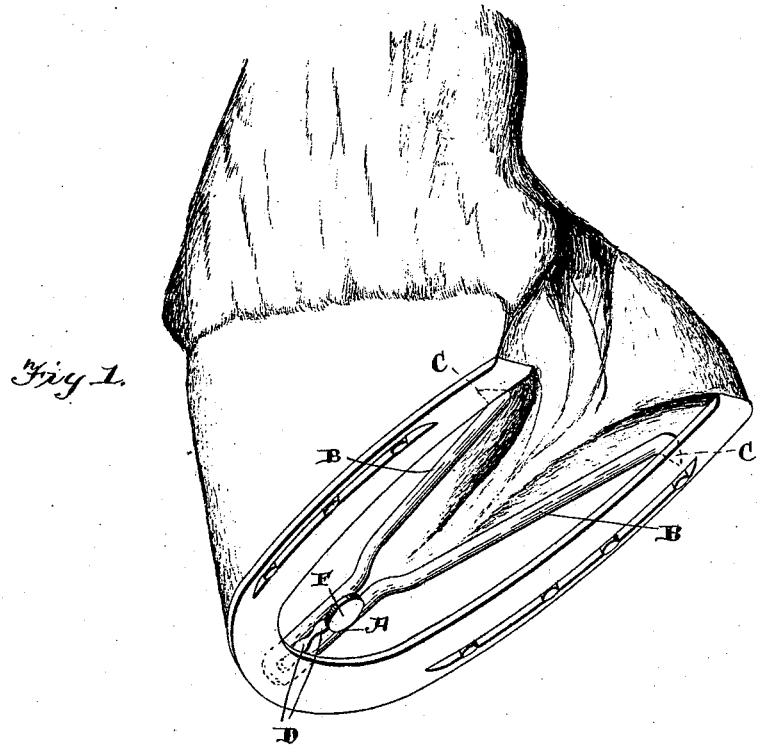
Fig. 1.
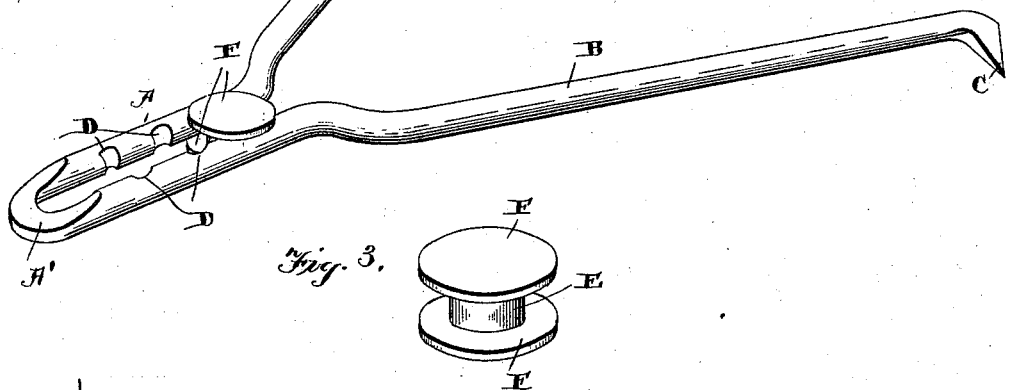
Fig. 2.
Fig. 3.
WITNESSES
Geo. E. Free
Roland A. Fitzgerald
INVENTOR
E. B. Chadwick
By Lehmann Pattison & Nesbit
attys

UNITED STATES PATENT OFFICE.

EZRA B. CHADWICK, OF BRISTOL, RHODE ISLAND.

HOOF-EXPANDER.

SPECIFICATION forming part of Letters Patent No. 497,629, dated May 16, 1893.

Application filed February 13, 1893. Serial No. 462,116. (No model.)

*To all whom it may concern:*

Be it known that I, EZRA B. CHADWICK, of Bristol, in the county of Bristol and State of Rhode Island, have invented certain new and useful Improvements in Hoof-Expanders; and I do hereby declare the following to be a full, clear, and exact description of the invention, such as will enable others skilled in the art to which it pertains to make and use the same, reference being had to the accompanying drawings, which form a part of this specification.

My invention relates to an improvement in hoof-expanders; and it is directed more especially to the novel manner of regulating the tension of the spring arms, as will be fully described hereinafter, and especially referred to in the claims.

The object of my invention is to provide a spreader which may be easily adjusted to the hoof and also removed therefrom with little inconvenience, and one which is so constructed that the pressure of its spring arms may be varied to meet the special requirements of each case.

Referring to the accompanying drawings,—Figure 1 shows my improved spreader in position on the hoof. Fig. 2 is a detached perspective view of the same. Fig. 3 is a similar view of the pressure adjusting stud.

The spreader is preferably formed of a single piece of spring wire which is bent as shown to form a U-shaped shank A and the diverging spring arms B, the latter having at their extremities the spurs C. The adjacent faces of the parallel sides of shank A, are notched at intervals as shown at D. A shank E, having heads F, constitutes a stud which is adjustable longitudinally in the shank. The diameter of the shank E, is a little greater than the width of the notch spaces between the shank sides so that as the stud is pushed rearward in the shank A the spring arms will be spread as will be readily understood, the notches D, serving to hold the stud securely in the desired adjustment. When in position as shown in Fig. 1 the spurs C, engage the heels of the hoof while the end of shank A, which is slightly sharpened as at A', is inserted beneath the shoe. The spreader is thus held firmly in place. The spreaders may be varied in size as may also the kinds of wire used.

Having thus fully described my invention, what I claim as new, and desire to secure by Letters Patent, is—

1. A spreader comprising an expansible shank, spring arms projecting from opposite sides thereof, and a stud adjustable longitudinally in the shank for expanding the same, substantially as shown and described.

2. A spreader comprising an expansible shank which is formed with notches on its inner faces, spring arms diverging from the respective sides of the shank, and a stud adjustable in the shank which is held in the desired position by the notches thereof, substantially as shown and described.

3. A spreader formed wholly of wire and comprising a U-shaped shank, spring arms extending therefrom, and a stud adjustable in the shank for expanding the same, substantially as shown and described.

4. A spreader formed wholly of spring wire and comprising a U-shaped shank having notches on its inner faces, spur carrying arms diverging therefrom, and a stud adjustable in the shank and which is held in position by the notches thereof, substantially as shown and described.

In testimony whereof I affix my signature in presence of two witnesses.

EZRA B. CHADWICK.

Witnesses:
JOSIAH F. PUKHAM,
GEO. H. PECK.